United States Patent
Noda et al.

(10) Patent No.: US 6,388,033 B2
(45) Date of Patent: May 14, 2002

(54) PROCESS FOR PREPARING FLUOROPOLYMER

(75) Inventors: Tomohisa Noda; Satoshi Komatsu, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/794,104

(22) Filed: Feb. 28, 2001

(30) Foreign Application Priority Data

Feb. 25, 2000 (JP) ........................................ 2000-053518

(51) Int. Cl.$^7$ .......................... C08F 2/22; C08F 214/26; C08F 214/18
(52) U.S. Cl. ........................ 526/206; 526/247; 526/250; 526/253; 526/255
(58) Field of Search ................................ 526/206, 250, 526/255, 253, 247

(56) References Cited

U.S. PATENT DOCUMENTS

| | | | | |
|---|---|---|---|---|
| 5,789,504 A | * | 8/1998 | Ihara | ........................ 526/206 |
| 6,051,682 A | * | 4/2000 | Debrabander | ................ 528/501 |
| 6,140,437 A | * | 10/2000 | Kitaichi | ....................... 526/247 |

FOREIGN PATENT DOCUMENTS

| | | |
|---|---|---|
| JP | 6143364 | 9/1986 |
| JP | 06211933 A BS * | 8/1994 |

* cited by examiner

Primary Examiner—Fred Zitomer
(74) Attorney, Agent, or Firm—Birch, Stewart, Kolasch & Birch, LLP

(57) ABSTRACT

A process for preparing a fluoropolymer by the batchwise polymerization of a monomer mixture containing tetrafluoroethylene, in which, after the initiation of a reaction, the monomers are reacted under conditions such that the monomer mixture is supplemented to a polymerization system in an amount more than the amount of the monomers consumed and simultaneously the excessive unreacted monomers are discharged from the polymerization system to maintain the monomer composition in the polymerization system substantially the same as that of the composition of the monomer mixture initially charged, and the monomer mixture supplemented to the polymerization system contains a compound suppressing the autoexplosion of the monomers.

11 Claims, No Drawings

PROCESS FOR PREPARING FLUOROPOLYMER

BACKGROUND OF THE INVENTION

1. Field of the Invention

The present invention relates to a process for preparing a fluoropolymer. In particular, the present invention relates to a process for safely carrying out a batchwise polymerization by making the composition of a monomer mixture, which are supplemented under a high pressure, outside an explosion limit.

2. Prior Art

When a fluorine-containing copolymer comprising hexafluoropropylene (HFP) is prepared, a monomer mixture in a polymerization system should contain 50 to 90% by mole of HFP to obtain a copolymer containing 5 to 20% by weight of HFP. In addition, usually the supplemented monomer mixture should be supplied under a high pressure of at least 1 MPaG.

In general, the HFP content in the obtained copolymer is less than the HFP content in the monomer mixture present in the polymerization system because of the different of the polymerization reactivities of HFP and other monomer(s). This means that the other monomers are more consumed than HFP. Thus, the HFP content in the supplemented monomer mixture is maintained less than 30% by mole. However, the monomer mixture containing less than 30% by mole of HFP is in the explosion limit depending on the process pressure. Nevertheless, the supplemented monomer mixture should be pressurized and supplied in the polymerization system. Thus, the polymerization process is always threatened with the danger of explosion.

For example, in Examples described in JP-B-61-43364, after water and a dispersant are charged in a reactor, HFP and tetrafluoroethylene (TFE) are supplied, and then a polymerization initiator is charged to initiate the polymerization. After the initiation of the polymerization, TFE is supplied in the reactor with varying a stirring speed to maintain a polymerization pressure at 4.1 MPa.

In the conventional batchwise process for preparing a copolymer of TFE and ethylene, as described in, for example, JP-A-6-211933, the polymerization is carried out with adding perfluorocyclobutane to the mixture of TFE and ethylene so that the composition is outside the explosion limit. To increase the productivity, it is necessary to increase the polymerization reaction rate. When the polymerization pressure is increased to increase the reaction rate, it is inevitable to increase the pressure of the monomers supplied. To maintain the condition outside the explosion limit under such a high pressure, the content of perfluorocyclobutane in the monomer mixture should be increased. However, if the content of perfluorocyclobutane is increased, the amount of perfluorocyclobutane in the polymerization reactor increases and thus the space volume utilized by the polymerization in the reactor decreases. Therefore, the yield of the polymer per unit volume of the reactor decreases.

SUMMARY OF THE INVENTION

One object of the present invention is to provide a process for effectively preparing a fluoropolymer by a batchwise polymerization while supplying a monomer mixture comprising TFE safely.

According to the present invention, there is provided a process for preparing a fluoropolymer comprising batchwise polymerizing a monomer mixture containing tetrafluoroethylene and optionally at least one comonomer selected from the group consisting of hexafluoropropylene, vinylidene fluoride, trifluorochloroethylene, ethylene and perfluoroalkyl vinyl ethers, wherein after the initiation of a reaction, the monomers are reacted under conditions such that the monomer mixture is supplemented to a polymerization system in an amount more than the amount of the monomers consumed and simultaneously the excessive unreacted monomers are discharged from the polymerization system to maintain the monomer composition in the polymerization system substantially the same as that of the composition of the monomer mixture initially charged, and the monomer mixture supplemented to the polymerization system contains a compound suppressing the autoexplosion of the monomers.

Herein, the term "autoexplosion" is intended to mean the abrupt increase of a temperature and a pressure caused by the abrupt self-decomposition of TFE. The term "explosion limit" is intended to mean marginal conditions (e.g. the monomer composition, pressure, etc.) where the monomer gas explodes when an energy of 1 to 2 J is applied to the monomer gas sealed in a closed vessel. When the monomer mixture explodes by the application of an energy of 1 to 2 J, the monomer mixture is within the explosion limit.

DETAILED DESCRIPTION OF THE INVENTION

The fluorine-containing polymer or copolymer prepared by the process of the present invention is a polymer comprising TFE. In the case of the copolymer, examples of the comonomer include hexafluoropropylene (HFP), vinylidene fluoride (VdF), trifluorochloroethylene (FCl), ethylene (Et) and perfluoroalkyl vinyl ethers (PAVE) (e.g. perfluoromethyl.vinyl ether (PMVE), perfluoroethyl vinyl ether (PEVE), perfluoropropyl vinyl ether (PPVE), etc.), and the like.

According to the present invention, the monomer or the monomer mixture contains a compound suppressing the autoexplosion of the monomer(s). Examples of such a compound include HFP which is a monomer and also functions as a compound suppressing the autoexplosion of the monomer(s); a compound which is used as a solvent for the polymerization and does not substantially interfere with the polymerization, for example, perfluorocyclobutane (C318), etc.; and a compound which is used as a diluent of the monomer(s) and does not substantially interfere with the polymerization, for example, perfluoromethane, perfluoroethane, perfluoropropane, perfluorobutane, etc. These compounds may be used independently or as a mixture of two or more of them.

In the process of the present invention, TFE and at least one monomer selected from the group consisting of hexafluoropropylene, vinylidene fluoride, trifluorochloroethylene, ethylene and perfluoroalkyl vinyl ethers is batchwise polymerized.

In a preferred embodiment of the present invention, the monomers supplemented to the polymerization system are tetrafluoroethylene and ethylene, a compound suppressing the autoexplosion of the monomers is perfluorocyclobutane, and the content of perfluorocyclobutane is at least 5% by mole, or the monomer supplemented to the polymerization system is tetrafluoroethylene, and a compound suppressing the autoexplosion of the monomer is at least one compound selected from the group consisting of perfluoromethane, perfluoroethane, perfluoropropane and perfluorobutane.

In a more preferred embodiment, the monomer mixture supplemented to the polymerization system comprises tetrafluoroethylene, hexafluoropropylene and optionally ethylene and/or vinylidene fluoride, and hexafluoropropylene is used as a compound suppressing the autoexplosion of the monomer. In this case, the content of hexafluoropropylene is at least 35% by mole, while the fluoropolymer obtained contains less than 35% by mole of hexafluoropropylene.

In a particularly preferred embodiment, the monomer mixture supplemented contains tetrafluoroethylene and hexafluoropropylene; tetrafluoroethylene, hexafluoropropylene and ethylene, or tetrafluoroethylene, hexafluoropropylene and vinylidene fluoride.

The specific examples of the polymers and their compositions, the charged monomers and their compositions, and the compound suppressing the autoexplosion of the monomers (explosion-suppressing compound) are listed below.

TABLE 1

| Polymer (composition: molar ratio) | Charged monomer (molar ratio) | Explosion-suppressing compound |
|---|---|---|
| TFE-HFP-PAVE copolymer (TFE/HFP/PAVE = 65–95/5–30/0–2) | TFE/HFP/PAVE = 10–65/90–35/0–10 | HFP |
| TFE-HFP-VdF copolymer (TFE/HFP/VdF = 40–50/5–15/40–50) | TFE/HFP/VdF = 20–50/30–60/20–50 | HFP |
| TFE-HFP-Et copolymer (TFE/HFP/Et = 30–50/5–25/33–55) | TFE/HFP/Et = 30–40/50–60/5–20 | HFP |
| TFE-Et copolymer (TFE/Et = 40–60/40–60) | TFE/Et/C318 = 40–60/30–50/5–25 | C318 |
| TFE-PMVE copolymer (TFE/PMVE = 97–50/3–50) | TFE/PMVE/CF$_4$ = 5–90/10–90/5–20 | CF$_4$ |
| TFE-PAVE copolymer (TFE/PMVE = 95–9913–50) | TFE/PAVE/CF$_4$ = 70–95/1–10/5–30 | CF$_4$ |
| PTFE (homopolymer) | TFE/CF$_4$ = 70–95/5–30 | CF$_4$ |

The amount of the compound suppressing the autoexplosion of the monomer(s) can be suitably determined by making reference to the above compositions in Table 1 so that the composition of the monomer mixture charged is outside the explosion limit, since it depends on the kinds of the monomers, the polymerization pressure and temperature, and the kind of the compound suppressing the autoexplosion of the monomer(s).

In the course of the polymerization, the compound suppressing the autoexplosion of the monomer(s) should be removed from the reactor so that it is not accumulated in the reactor. Thus, the excessive amount of the monomer(s) should be supplied in the reactor to maintain the pressure in the reactor at the determined level.

The mixture of the monomer(s) supplemented and the compound suppressing the autoexplosion of the monomer(s) is supplied in the reactor under a pressure of preferably at least 1 MPaG, more preferably at least 2 MPaG and not exceeding the pressure resistance limit of the reactor.

The mixture of the unreacted monomer(s) removed from the polymerization system maybe recycled to the polymerization system, if desired.

In such a case, the total pressure of the unreacted monomer(s) removed from the polymerization system and the compound suppressing the autoexplosion of the monomer(s) is once reduced to a pressure lower than the total pressure of the monomer(s) supplemented to the polymerization system, and then the monomer necessary to restore the composition of the monomer(s) to be supplemented is supplemented, and the mixture is pressurized and recycled to the polymerization system.

In particular, it is preferable that the total pressure of the unreacted monomer(s) removed from the polymerization system and the compound suppressing the autoexplosion of the monomer(s) is reduced to a pressure lower than the pressure at which the monomer(s) to be supplemented has the autoexplosive property.

EXAMPLES

The present invention will be illustrated by the following Examples, which do not limit the scope of the invention in any way.

Example 1

A vertical type stainless steel reactor (with a volume of 3 liters) equipped with an agitator was evacuated. Then, degassed distilled water (1.8 kg) and a 10 wt. % aqueous solution of a fluorine-containing surfactant ($C_7F_{15}COONH_4$) (26.5 g) as an emulsion-stabilizer were charged in the reactor. Furthermore, a TFE/HFP monomer mixture (TFE/HFP=30/70 by mole) was charged, and the temperature of the reactor was gradually raised while stirring. When the temperature reached 95° C., the pressure in the reactor rose to 4.2 MPaG. Thereafter, the pressure in the reactor was controlled at 4.2 MPaG with a back-pressure regulator, and a TFE/HFP monomer mixture (TFE/HFP=30/70 by mole) was charged in the reactor. At the same time, a 10 wt. % aqueous solution of ammonium persulfate (15 g) was added to initiate the polymerization reaction. Just after the initiation of the reaction, the polymerization was continued with charging the TFE/HFP monomer mixture (TFE/HFP=30/70 by mole) at a rate of 30 mole/hr. which was larger than the amount of the monomer mixture consumed until the completion of the reaction while the 10 wt. % aqueous solution of ammonium persulfate was continuously added at a rate of 10 mg/min. and the pressure in the reactor was maintained at 4.2 MPaG with the back-pressure regulator.

After 90 minutes from the initiation of the reaction, the supply of the monomers was stopped, and the unreacted monomer mixture was removed from the reactor. Then, the dispersion was recovered, and nitric acid was added to the dispersion to coagulate the polymer. Thus,. the white polymer powder was obtained. The weight of the polymer powder was 445 g after drying.

The molar ratio of TFE/HFP in the copolymer obtained was 91/9 (by mole), and MFR was 19.2 g/10 min. The MFR was measured at 372° C. according to ASTM D2116.

Example 2

A vertical type glass-lined reactor (with a volume of 4 liters) equipped with an agitator was evacuated. Then, degassed distilled water (1 kg) was charged and then a TFE/HFP/ethylene monomer mixture (TFE/HFP/ethylene= 30/63/7 by mole) was charged. The temperature of the reactor was gradually raised while stirring. When the temperature reached 55° C., the pressure in the reactor rose to 2.4 MPaG. Thereafter, the pressure in the reactor was controlled at 2.4 MPaG with a back-pressure regulator, and the TFE/HFP/ethylene monomer mixture (TFE/HFP/ethylene=30/63/7 by mole) was charged in the reactor. At the same time, n-propyl peroxidicarbonate (NPP)

(manufactured by NOF Corporation) (3 g), which was diluted to 50% by weight with methanol, was added to initiate the polymerization reaction. Until the completion of the reaction, the polymerization was continued with charging the TFE/HFP/ethylene monomer mixture (TFE/HFP/ethylene=30/63/7 by mole) in an amount which was larger than the amount of the monomer mixture consumed while the pressure in the reactor was maintained at 2.4 MPaG with the back-pressure regulator.

After 60 minutes from the initiation of the reaction, the supply of the monomer mixture was stopped, and the unreacted monomer mixture was removed from the reactor. Then, the dispersion was recovered, and nitric acid was added to the dispersion to coagulate the polymer. Thus the white polymer powder was obtained. The weight of the polymer powder was about 100 g after drying.

The molar ratio of TFE/HFP/ethylene in the copolymer obtained was 37/18/45 (by mole), and MFR was 5 g/10 min.

Example 3

A vertical type glass-lined reactor (with a volume of 3 liters) equipped with an agitator was evacuated. Then, degassed distilled water (1.8 kg) and a 10 wt. % aqueous solution of a fluorine-containing surfactant ($C_7F_{15}COONH_4$) (26.5 g) as an emulsion-stabilizer were charged in the reactor. Furthermore, a TFE/HFP/monomer mixture (TFE/HFP=30/70 by mole) was charged. The temperature of the reactor was gradually raised while stirring. When the temperature reached 95° C., the pressure in the reactor rose to 4.2 MPaG. Thereafter, the pressure in the reactor was controlled at 4.2 MPaG with a back-pressure regulator, and the TFE/HFP monomer mixture (TFE/HFP=30/70 by mole) was charged in the reactor. At the same time, a 10 wt. % aqueous solution of ammonium persulfate (15 g) was added to initiate the polymerization reaction. Just after the initiation of the reaction, the polymerization was continued with charging the TFE/HFP monomer mixture (TFE/HFP=30/70 by mole) in an amount larger than the amount of the monomer mixture consumed until the completion of the reaction while the 10 wt. % aqueous solution of ammonium persulfate was continuously added at a rate of 10 mg/min. and the pressure in the reactor was maintained at 4.2 MPaG with the back-pressure regulator.

The pressure of the unreacted monomer mixture recovered from the back-pressure regulator was reduced to 0.7 MPaG. To this monomer mixture, a TFE monomer at 0.8 MPaG was added so that the TFE/HFP molar ratio of the monomer mixture reached 30/70. Then, the monomer mixture obtained (TFE/HFP=30/70 by mole) was pressurized to 4.2 MPaG and recycled to the reactor.

After 92 minutes from the initiation of the reaction, the supply of the monomer mixture was stopped, and the unreacted monomer mixture was removed from the reactor. Then, the dispersion was recovered, and nitric acid was added to the dispersion to coagulate the polymer. Thus, the white polymer powder was obtained. The weight of the polymer powder was about 450 g after drying.

The molar ratio of TFE/HFP in the copolymer obtained was 91/9 (by mole), and MFR was 20.5 g/10 min.

What is claimed is:

1. A process for preparing a fluoropolymer comprising:
providing an initial monomer mixture containing a tetrafluoroethylene monomer and optionally at least one comonomer selected from the group consisting of hexafluoropropylene, vinylidene fluoride, trifluorochloroethylene, ethylene and perfluoroalkyl vinyl ethers;
initiating a batchwise polymerization of the monomer mixture in a polymerization system;
supplementing said monomer mixture during said polymerization with added monomer mixture containing a fluorine-containing compound to suppress autoexplosion of the monomer mixture, wherein said monomer mixture is added in an amount greater than the amount of the monomers consumed and simultaneously removing excess unreacted monomers from the polymerization system to maintain a monomer composition in the polymerization system substantially the same as that of the composition of the monomer mixture initially charged.

2. The process according to claim 1, wherein said compound suppressing the autoexplosion of the monomer mixture is at least one fluorine-containing compound selected from the group consisting of hexafluoropropylene, perfluorocyclobutane, perfluoromethane, perfluoroethane, perfluoropropane and perfluorobutane.

3. The process according to claim 1, wherein the total pressure of the monomer mixture added to the polymerization system and said fluorine-containing compound suppressing the autoexplosion of the monomer mixture is at least 1 MPaG.

4. The process according to claim 1, wherein the total pressure of said unreacted monomers removed from the polymerization system and said fluorine-containing compound suppressing the autoexplosion of the monomer mixture is reduced to a pressure lower than the total pressure of the monomer mixture added to the polymerization system, and then an amount of monomer mixture necessary to restore the composition of the monomer mixture is added, and the monomer mixture is pressurized and recycled to the polymerization system.

5. The process according to claim 4, wherein the total pressure of said unreacted monomers removed from the polymerization system and said fluorine-containing compound suppressing the autoexplosion of the monomer mixture is reduced to a pressure lower than a pressure at which the monomer mixture to be added exhibits autoexplosive properties.

6. The process according to claim 1, wherein said monomer mixture added to the polymerization system comprises at least two monomers selected from the group consisting of tetrafluoroethylene, hexafluoropropylene, ethylene and vinylidene fluoride provided that tetrafluoroethylene and hexafluoropropylene are each present, said fluorine-containing compound suppressing the autoexplosion of the monomer mixture is hexafluoropropylene, the amount of hexafluoropropylene present is at least 35 mole %, and said fluoropolymer obtained contains less than 35 mole % of hexafluoropropylene.

7. The process according to claim 6, wherein said monomer mixture added to the polymerization system comprises tetrafluoroethylene and hexafluoropropylene.

8. The process according to claim 6, wherein said monomer mixture added to the polymerization system comprises tetrafluoroethylene, hexafluoropropylene and ethylene.

9. The process according to claim 6, wherein said monomer mixture added to the polymerization system comprises tetrafluoroethylene, hexafluoropropylene and vinylidene fluoride.

10. The process according to claim 1, wherein said monomer mixture added to the polymerization system comprises tetrafluoroethylene and ethylene, said compound suppressing the autoexplosion of the monomers is perfluorocyclobutane, and the content of perfluorocyclobutane is at least 5 mole %.

11. The process according to claim 1, wherein said monomer mixture added to the polymerization system comprises tetrafluoroethylene, and said compound suppressing the autoexplosion of the monomers is at least one compound selected from the group consisting of perfluoromethane, perfluoroethane, perfluoropropane and perfluorobutane.

* * * * *

UNITED STATES PATENT AND TRADEMARK OFFICE
CERTIFICATE OF CORRECTION

PATENT NO. : 6,388,033 B2
DATED : May 14, 2002
INVENTOR(S) : Tomohisa Noda et al.

It is certified that error appears in the above-identified patent and that said Letters Patent is hereby corrected as shown below:

Title page,
Item [30], Foreign Application Priority Data, please correct the date from "Feb. 25, 2000" to -- Feb. 29, 2000 --.

Signed and Sealed this

Eleventh Day of February, 2003

JAMES E. ROGAN
*Director of the United States Patent and Trademark Office*